No. 895,888. PATENTED AUG. 11, 1908.
J. E. NOEGGERATH.
UNIPOLAR DYNAMO ELECTRIC MACHINE.
APPLICATION FILED APR. 1, 1907.
2 SHEETS—SHEET 1.
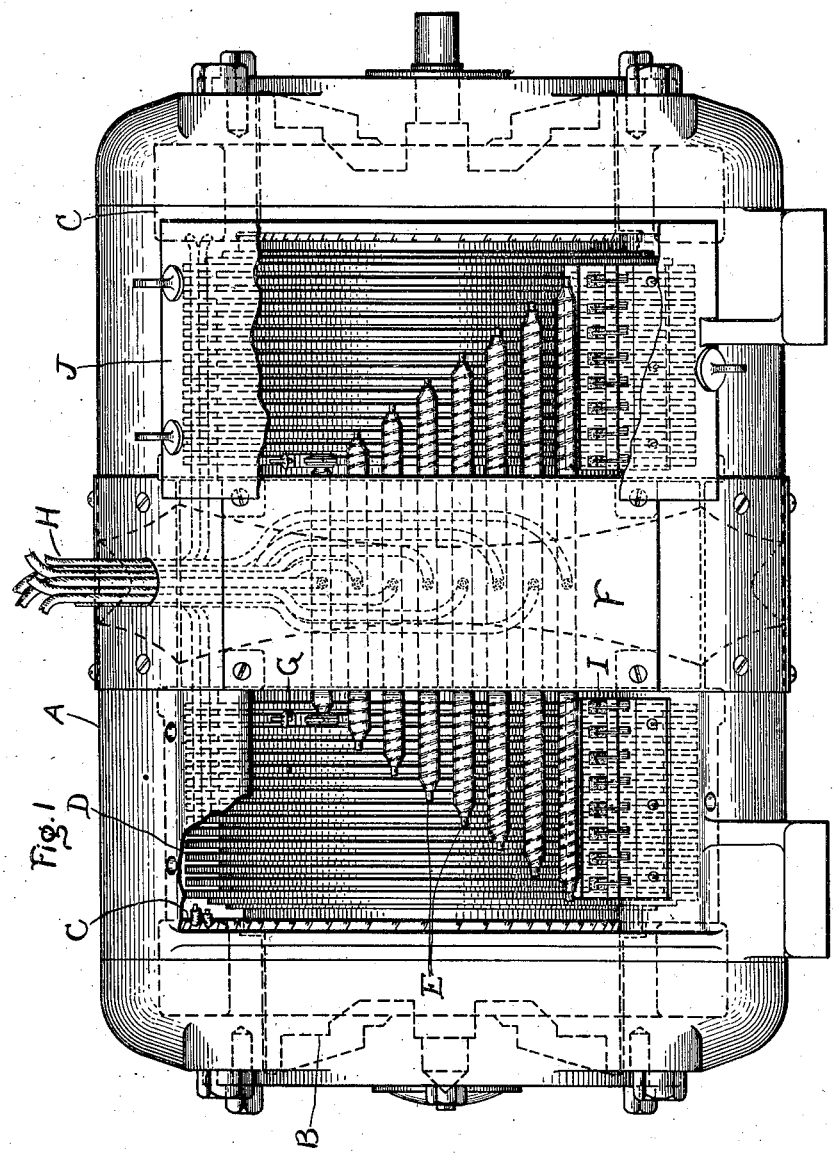
WITNESSES:
INVENTOR
JAKOB E. NOEGGERATH,
BY
ATT'Y.

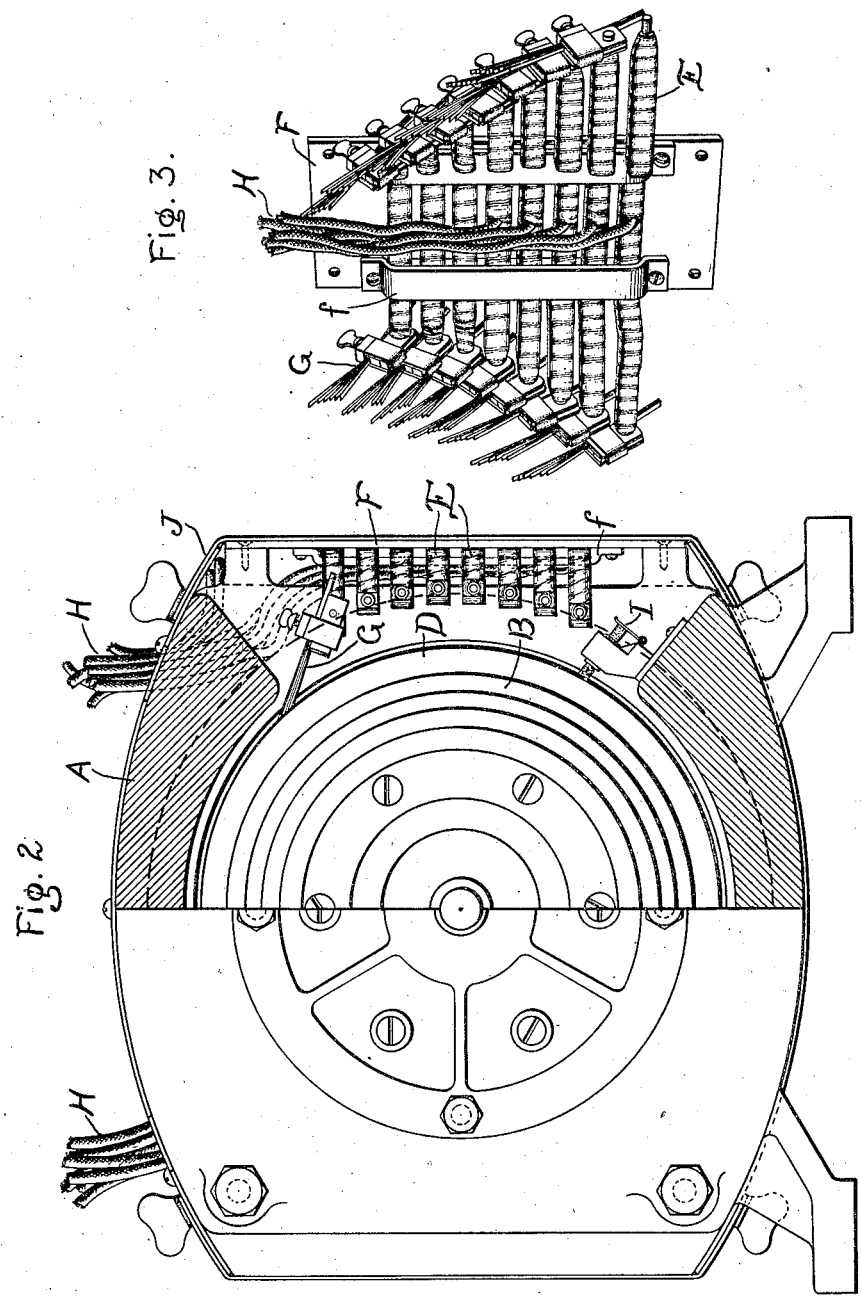

UNITED STATES PATENT OFFICE.

JAKOB E. NOEGGERATH, OF SCHENECTADY, NEW YORK, ASSIGNOR TO GENERAL ELECTRIC COMPANY, A CORPORATION OF NEW YORK.

UNIPOLAR DYNAMO-ELECTRIC MACHINE.

No. 895,888.  Specification of Letters Patent.  Patented Aug. 11, 1908.

Application filed April 1, 1907. Serial No. 365,679.

*To all whom it may concern:*

Be it known that I, JAKOB E. NOEGGERATH, a citizen of the United States, residing at Schenectady, county of Schenectady, State of New York, have invented certain new and useful Improvements in Unipolar Dynamo-Electric Machines, of which the following is a specification.

My invention relates to unipolar dynamo-electric machines, and particularly to small machines of this type; and its object is to provide certain improvements in the construction and arrangement of such machines.

Except in low-voltage machines, the armatures of unipolar generators are provided with a plurality of conductors and collector rings through which the armature conductors are connected in series by means of stationary cross-connecting conductors and brushes bearing on the collector rings. In order to render the cross-connecting conductors readily accessible, I provide a plate detachably secured to the field structure, and mount the cross-connecting conductors on this member so that they are bodily removable as a unit with the plate.

My invention further consists in mounting the brushes directly on these conductors, so that the brushes also are removable with the plate for inspection and renewal.

My invention will best be understood by reference to the accompanying drawings, in which Figure 1 shows a side elevation, with the casing partly broken away, of a dynamo-electric machine arranged in accordance with my invention; Fig. 2 shows an end elevation of the same, partly in cross-section; and Fig. 3 shows a perspective view of the removable plate, cross-connecting conductors and brushes.

In the drawings, A represents the field magnet, and B the armature, the outlines of which are shown in dotted lines in Fig. 1. C C represent the field coils which surround the armature and produce a magnetization which may be considered as entering the armature from the center of the field magnet, which extends uniformly around the armature so as to produce a unipolar field, and as passing outward in both directions through the armature and back into the field-magnet at the ends of the armature. The armature, as usual, is provided with a plurality of armature conductors, (not shown), which are connected at their ends to collector rings D. For cross-connecting the collector rings so as to place the armature conductors in series, conductors E are provided, which are formed of flat insulated strips secured to a plate F by clamps *f*. This plate F is detachably supported on the field-magnet by screws, as shown in Fig. 2. Preferably, two of these plates are provided,—one on each side of the field magnet. Brushes G are mounted directly on the ends of the conductors E, and are consequently removable with the plate F for inspection and renewal. Current leads H are connected to the central points of some or all of the conductors E, so that a plurality of currents of different voltages may be derived from the machine.

The brushes G are formed of superposed flexible metallic strips, since this type of brush is most satisfactory for collecting current at high speed. Idle lubricating brushes I formed of graphite or other suitable lubricating material also bear on the collector rings, and while performing no electrical function, serve to lubricate the rings and decrease the wear on the current collecting rings and brushes. Cover plates J may be provided which protect the ends of the conductors E and the brushes, but which are readily removed to permit inspection.

What I claim as new and desire to secure by Letters Patent of the United States, is,

1. In a dynamo-electric machine, a unipolar field structure, an armature provided with a plurality of collector rings, a detachable member secured to the field structure, and conductors for cross-connecting the collector rings carried by and movable with said member.

2. In a dynamo-electric machine, a unipolar field structure, an armature provided with a plurality of collector rings, a detachable member secured to the field structure, conductors carried by and removable with said member, and brushes carried by said removable conductors and bearing on said rings.

3. In a dynamo-electric machine, a unipolar field structure, an armature provided with a plurality of collector rings, a detachable member secured to the field structure, conductors for cross-connecting the collector rings carried by and removable with said member, and brushes also removable with said member bearing on said rings and connected to the conductors carried by said member.

4. In a dynamo-electric machine, a unipolar field structure, an armature provided with a plurality of collector rings, a detachable plate secured to the field structure, a plurality of flat conductors clamped to said plate and extending parallel to the armature conductors, and brushes carried by said flat conductors bearing on said collector rings.

5. In a dynamo-electric machine, a unipolar field structure, an armature provided with a plurality of collector rings, a detachable member secured to the field structure, conductors for cross-connecting the collector rings carried by and movable with said member, and current-leads connected to the centers of the cross-connecting conductors.

6. In a dynamo-electric machine, a unipolar field structure, an armature provided with a plurality of collector-rings, a detachable member secured to the field structure, conductors carried by and removable with said member, brushes carried by said removable conductors and bearing on said rings, and current-leads connected to the centers of said removable conductors.

In witness whereof I have hereunto set my hand this 29th day of March, 1907.

JAKOB E. NOEGGERATH.

Witnesses:
BENJAMIN B. HULL,
HELEN ORFORD.